April 22, 1969    C. BOORMAN ET AL    3,439,737
SPACER GRID FOR HEAT EXCHANGE ELEMENTS WITH
MIXING PROMOTION MEANS
Filed Nov. 14, 1966
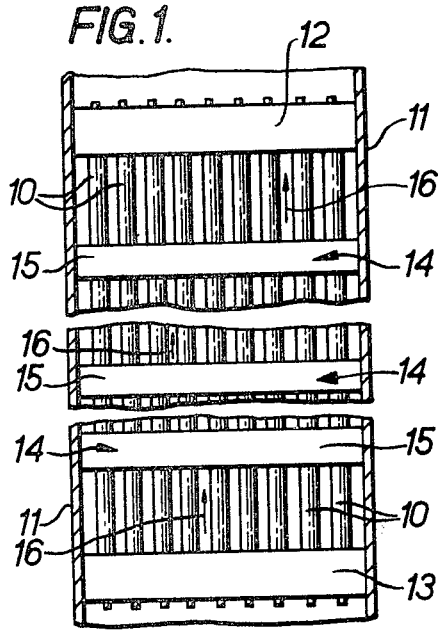
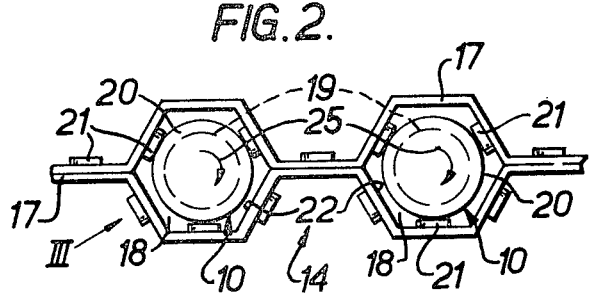
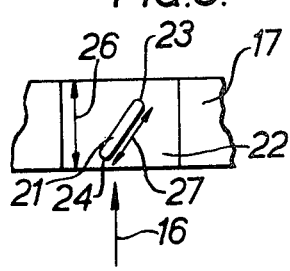
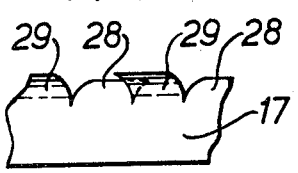

United States Patent Office 3,439,737
Patented Apr. 22, 1969

3,439,737
SPACER GRID FOR HEAT EXCHANGE ELEMENTS WITH MIXING PROMOTION MEANS
Colin Boorman, Altringham, Cheshire, and Colin Betts, Hale, Cheshire, England, assignors to United Kingdom Atomic Energy Authority, London, England
Filed Nov. 14, 1966, Ser. No. 594,168
Claims priority, application Great Britain, Nov. 23, 1965, 49,744/65
Int. Cl. F28f 13/12
U.S. Cl. 165—109                2 Claims

ABSTRACT OF THE DISCLOSURE

A spacer grid of cellular form for an assembly of elongate heat exchange elements includes projections for locating the elements and for promoting mixing of coolant passing through the cell. An irregular edge provided on one side of the grid promotes eddy diffusion in coolant passing through the grid.

---

This invention relates to assemblies of heat exchange elements and is particularly applicable to nuclear reactor fuel assemblies such as comprise a plurality of fuel rods clustered in spaced array.

In a nuclear reactor fuel assembly of the kind mentioned above the fuel rods are usually end supported and spaced one from another at intervals along their length by transverse spacer grids. Previously proposed spacer grids have been of cellular form, penetrated by the fuel rods, and designed to restrain radial deflection of the fuel rods. In use of such nuclear fuel assemblies in a nuclear reactor it is customary to cool the assemblies by means of a stream of coolant which passes longitudinally over the fuel rods.

The present invention resides in a spacer grid for an assembly of elongate heat exchange elements clustered in spaced array, the grid being of cellular form and cells of the grid each having projections which are adapted to engage, and thereby locate, an elongate heat exchange element extending through the cell and which are shaped to possess inclination with respect to the axis of the element so as to promote mixing of coolant in a coolant flow stream passing through the cell.

The invention also includes within its scope an assembly of elongate heat exchange elements clustered in spaced array and a spacer grid of cellular form, cells of the grid each having projections which engage, and thereby locate, an elongate heat exchange element extending through the cell and which are shaped to possess inclination with respect to the axis of the element so as to promote mixing of coolant in a coolant flow stream passing through the cell.

The arrangement is considered to provide for efficient heat transfer between the elements and the coolant, and in a preferred form of spacer grid for a nuclear fuel assembly the projections are shaped and arranged so as to impart to the coolant flowstream a rotational component of flow. Whereas coolant flow through a nuclear fuel asembly with conventional cellular spacer grid tends to be in channels between the defined by the fuel rods, the mixing or swirling of coolant promoted by the spacer grid of the invention is considered advantageous from the point of view of heat transfer considerations since it helps reduce hot channel factors arising from geometrical tolerances and local fuel element variations and also helps reduce coolant outlet temperature gradients arising from heat flux gradients across the assembly, without a prohibitive increase in the pressure drop experienced by the coolant.

In the accompanying exemplifying drawings:
FIGURE 1 is a part-sectional elevation of a nuclear reactor fuel assembly in accordance with the invention,
FIGURE 2 is an enlarged plan view of a part of FIGURE 1,
FIGURE 3 is a fragmentary view in the direction of arrow III of FIGURE 2, and
FIGURE 4 is a fragmentary view of a modification.

FIGURE 1 shows a nuclear reactor fuel assembly comprising a plurality of elongate fuel rods 10 clustered in spaced array with their longitudinal axes parallel within a casing or wrapper 11 of hexagonal cross-section. The fuel rods 10 are supported at their upper ends by an apertured upper support plate 12 secured to the wrapper 11. At their lower ends the fuel rods 10 are located against lateral displacement by an apertured lower locating plate 13, thus allowing for linear thermal expansion of the rods 10. The fuel rods 10 are spaced one from another at intervals along their length by transverse spacer grids 14 penetrated by the rods 10 and secured to the wrapper 11. The grids 14 are of cellular form, each comprising an outer hexagonal frame 15 secured to the wrapper 11. In use of the illustrated fuel assembly in a nuclear reactor the fuel rods 10 are cooled by a stream of coolant which passes longitudinally over the rods, as indicated by arrows 16.

FIGURE 2 shows strips 17 of hexagonal-meander shape which are joined together to define hexagonal cells 18 forming a cell structure of one of the spacer grids 14, it being understood that the strips 17 are joined at their ends to one of the frames 15 shown in FIGURE 1. Each cell 18 is penetrated by one fuel rod 10 containing fissile material 19 such as e.g. a mixture of uranium and plutonium oxides enclosed in a plain tubular sheath 20 constructed of stainless steel.

Referring to FIGURE 3 in conjunction with FIGURE 2, the strips 17 are formed with projections 21 so that each cell 18 has three such projections 21 directed inwardly into it and disposed on alternate ones of its six walls 22. In contrast to conventional cellular spacer grids having projections of circular form (often referred to as dimples), the projections 21 are of elongated form and are inclined with respect to the axis of the fuel rod engaged thereby. In other words each of the projections 21 slopes in extending from a lower to an upper region of its wall 22.

Each of the projections 21 has rounded upper and lower ends 23, 24 respectively and is symmetrically disposed with respect to its wall 22. In each cell 18 the three projections 21 are similarly orientated, and the fuel rod 10 penetrating that cell is located by point contact of its unribbed sheath 20 with the projections 21 at three circumferentially equi-spaced positions.

Coolant flowing upwardly as indicated by the arrows 16 is deflected by the projections 21 and thus has imparted to it in each cell 18 a rotational component of flow as indicated by arrows 25. In this way the projections 21 promote coolant swirling or mixing in the coolant flowstram passing through the grids 14, which is considered advantageous for the reasons given above. The strips 17 are arranged edge on to coolant flow through the assembly and the pressure drop experienced by the coolant is not prohibitively increased as compared with conventional spacer grids, the rounded ends 23, 24 being of assistance in this respect.

The components 11 to 14 are typically constructed from stainless steel and the projections 21 are conveniently formed by stamping or slotting of the strips 17. Purely by way of illustration, mention is made that for a depth D of spacer grid as represented by arrow 26 in FIGURE 3, the projections 21 typically may have a length of D/2 as represented by arrow 27 in FIGURE 3 and be disposed at an angle of 20° as represented by the included angle between the arrows 26, 27.

If it is considered to be desirable, the mixing of coolant promoted by the projections 21 may be enhanced by the promotion of turbulence by eddy diffusion in the coolant in the coolant flowstream leaving the grids 14. To this end FIGURE 4 shows that the upper edge of one of the strips 17 (that is to say the downstream edge relative to the direction of coolant flow through the assembly) is made irregular by having sections 28 curved in one direction (say towards but clear of one of the fuel rods) alternating with sections 29 curved in the opposite direction (e.g. away from but clear of the fuel rod), the sections being defined by vertical slits or incisions in the upper edge.

The invention is not limited to the details of the example described above with reference to the drawings. Thus e.g. the internal projections 21 whilst being similarly orientated in any one cell 18 may be arranged so as to give a rotational component of flow in one direction in some of the cells and in the opposite direction in others of the cells.

We claim:

1. A spacer grid for an assembly of elongate heat exchange elements clustered in spaced array with individual axes parallel, the grid being of cellular form and cells of the grid each having projections which are adapted to engage, and thereby locate, an elongate heat exchange element extending through the cell and which are shaped to possess inclination with respect to the axis of the element so as to promote mixing of coolant in a coolant flowstream passing through the cell, and an irregular edge provided on one side of the grid for promoting eddy diffusion in coolant passing through the grid.

2. A spacer grid according to claim 1 wherein the irregular edge comprises sections of cell wall which are defined by incisions and deformed out of the plane of the wall.

References Cited

UNITED STATES PATENTS

| | | | |
|---|---|---|---|
| 3,070,534 | 12/1962 | Kooistra | 176—78 |
| 3,176,762 | 4/1965 | Greenwood et al. | 165—162 |
| 3,281,327 | 10/1966 | Webb et al. | 176—76 |
| 3,344,855 | 10/1967 | Clark | 176—78 X |

FOREIGN PATENTS

| | | |
|---|---|---|
| 1,060,507 | 7/1959 | Germany. |
| 1,085,976 | 7/1960 | Germany. |
| 826,681 | 1/1960 | Great Britain. |
| 850,021 | 9/1960 | Great Britain. |
| 874,039 | 8/1961 | Great Britain. |
| 1,014,822 | 12/1965 | Great Britain. |

ROBERT A. O'LEARY, *Primary Examiner.*

ALBERT W. DAVIS, JR., *Assistant Examiner.*

U.S. Cl. X.R.

165—162, 178; 176—76, 78